July 17, 1956

R. C. RUSSELL 2,754,692

GEAR SHIFTING MECHANISM

Filed Feb. 19, 1952

INVENTOR.
Robert C. Russell.
BY
Harness, Dickey & Pierce
ATTORNEYS.

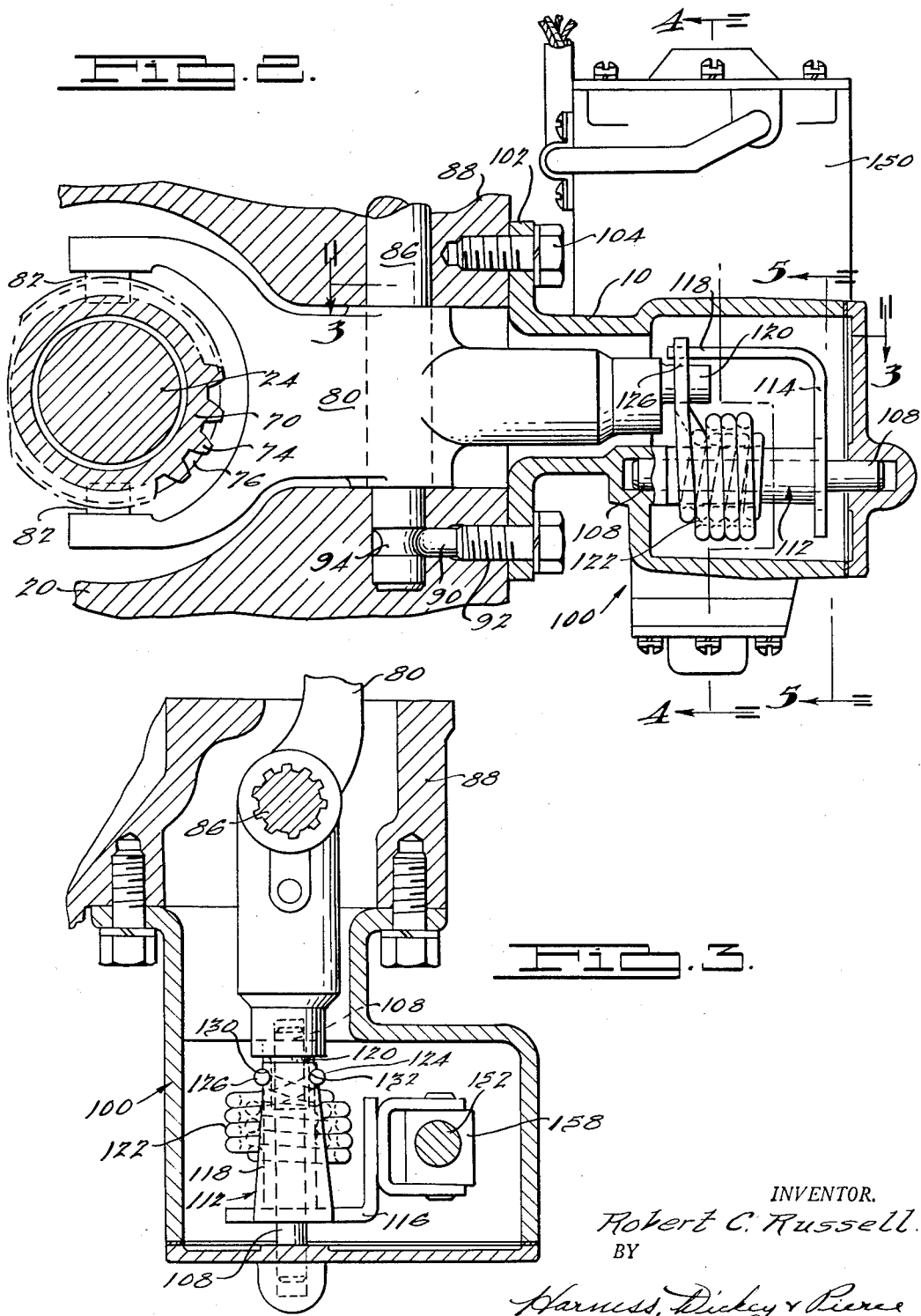

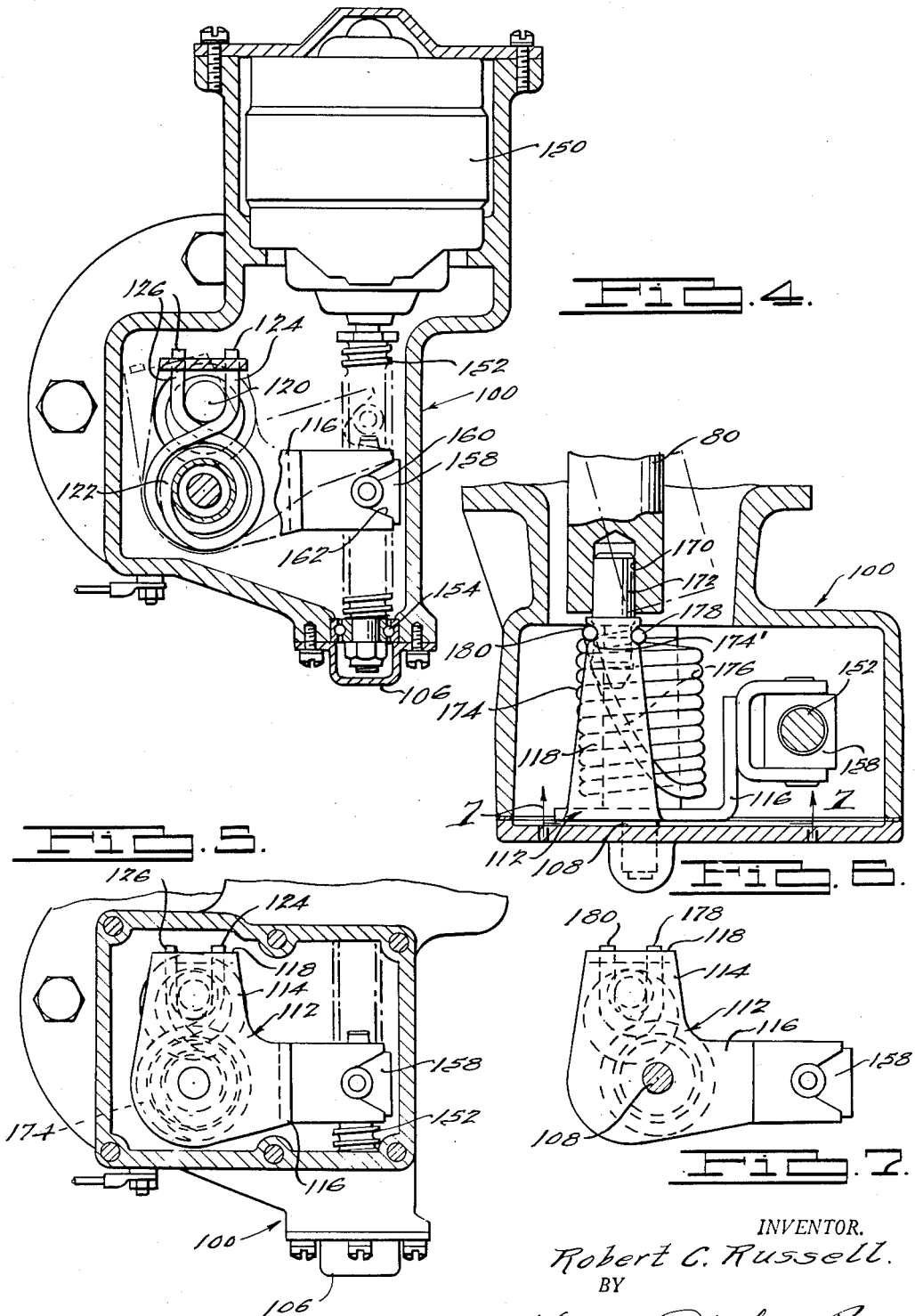

United States Patent Office 2,754,692
Patented July 17, 1956

2,754,692
GEAR SHIFTING MECHANISM

Robert C. Russell, Cleveland Heights, Ohio, assignor to Eaton Manufacturing Company, Cleveland, Ohio, a corporation of Ohio Application February 19, 1952, Serial No. 272,360

2 Claims. (Cl. 74—473)

The present invention relates to improvements in gear shifting mechanism and particularly relates to improvements in gear shifting mechanisms of the type disclosed and claimed in U. S. Letters Patent of Robert C. Russell, No. 2,462,779, granted February 22, 1949.

While the present invention has application to any geared change-speed construction including a shiftable element through which torque is applied in operation and wherein shifting of the element during the transmission of material torque therethrough is impossible, or at least impractical, because of the friction that would have to be overcome to shift it while under a torque load, it is particularly adaptable for use in connection with a shiftable element of change-speed mechanisms for motor vehicles.

The present invention is particularly adapted for use with two-speed rear axles and is so illustrated in the particular embodiment to be described hereinafter.

With the construction of the present invention, preselection of the shiftable position of a change-speed mechanism between two different positions of operation is accomplished by pre-loading a resilient or torsion spring connection between the shiftable member in the transmission and the means for pre-selecting the position. This shifting means includes a single spring, the ends of which are disposed in the path of movement of and engaged by the end of the shifting lever connected to the shiftable element in the transmission and are disposed in the path of movement of a single shifting arm which may be moved to the pre-selected position when desired. The construction is such that the pre-loaded spring will act in either direction, upon pre-selection in either direction, after the pressure on the teeth of the gears in the transmission is relieved to effect the desired or pre-selected shift through the action of the spring.

As compared with prior art constructions, the shifting means of the present invention employs fewer parts and is of a compact nature.

The primary objects of the present invention are to provide improved gear shifting mechanisms of the type mentioned which are compact and simplified in their construction and are more economical to manufacture, as compared to prior constructions.

In the drawings in which like numerals are used to designate like parts in the several views throughout:

Figure 2 is an enlarged, cross-sectional view, with parts in elevation, taken substantially along the line 2—2 of Figure 1;

Figure 3 is a cross-sectional view taken substantially along the line 3—3 of Figure 2;

Figure 4 is a cross-sectional view taken substantially along the line 4—4 of Figure 2;

Figure 5 is a cross-sectional view taken substantially along the line 5—5 of Figure 2;

Figure 6 is a partial view, similar to Figure 3, and illustrating a modified form of the present invention; and Figure 7 is a cross-sectional and elevational view taken substantially along the line 7—7 of Figure 6.

Figure 1:
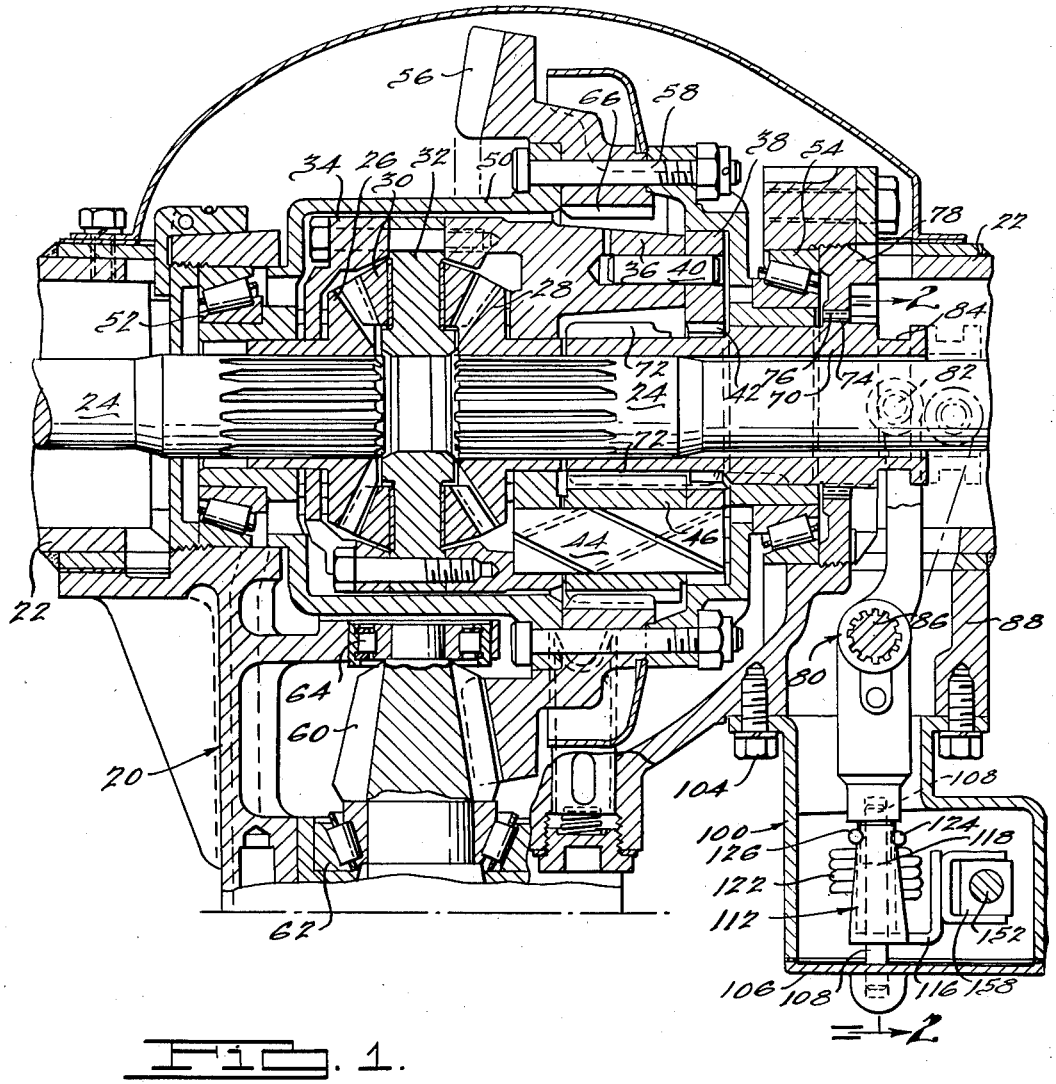
Figure 1 is a fragmentary, sectional view taken centrally through the differential and change-speed mechanism of a two-speed rear axle structure, illustrating the present invention, applied thereto for the purpose of shifting the shiftable element of the two-speed axle structure.

Referring to Figure 1 to explain the construction and operation of a two-speed axle mechanism to which the present invention is shown applied, it will be seen to include a cast differential housing indicated generally at 20, from opposite sides of which project the usual axle housing tubes 22 through which the axles or jack shafts 24 project and are enclosed. The inner splined ends of the axle shafts 24 are non-rotatably received in the complementary bores of the beveled gears 26 and 28, respectively, in a conventional manner, and the latter are operatively interconnected by a plurality of beveled gears 30 in mesh with both thereof and carried on pins 32 fixed in the differential carrier 34 which thus surrounds the differential gears. The differential carrier 34 is rotatably mounted upon the extended hubs of the gears 26 and 28, respectively, and its right-hand end as viewed in Figure 1 is extended as at 36 and has mounted on such extended end in concentric relation therewith a clutch ring 38 fixed against relative rotation with respect thereto by means of pins 40. The clutch ring 38 is provided with internal clutch teeth 42 arranged concentrically with and in radially outwardly spaced relation to the right-hand shaft 24.

The differential carrier 34 at a plurality and preferably at three equally angularly spaced points about its rotatable axis and at equal distance from the axis radially outwardly beyond the corresponding axle shaft 24 is provided with a corresponding number of axially parallel pins 44. The pins 44 are supported at their ends, and between their ends each rotatably supports thereon a pinion planet gear 46, the carrier 34 being cut away to permit each gear 46 to project radially outwardly therebeyond or at least to be exposed therethrough.

Arranged in surrounding relationship with respect to the differential carrier 34 is a ring gear carrier 50, the opposite ends of which are rotatably mounted by means of antifriction bearing assemblies 52 and 54, respectively, carried by the differential housing 20. A ring gear 56 disposed concentrically with the axle shafts 24 is fixed to the carrier 50 by means of bolts 58 and lies in mesh with the pinion gear 60 suitably mounted in the differential housing 20 by means of antifriction bearing assemblies 62 and 64, respectively. It will be noted from an inspection of Figure 1 that the ring gear 56 is of annular character and its bore is formed with teeth 66 forming an internal gear concentric with the axle shafts 24 and lying in mesh with the planet pinions 46.

The ring gear carrier 50 at its right-hand end is bored out concentrically with the corresponding axle shafts 24, but to a greater diameter. Axially slidably mounted in the bore in the right-hand end of the carrier 50 and surrounding the right-hand axle shaft 24 is a sleeve member 70, the axially inner end of which is provided with gear teeth 72 providing a sun gear of such diameter as to mesh with the pinion gears 46 when radially aligned therewith, as well as of such diameter as to be interlocked with the clutch teeth 42 of the differential carrier 34 when interengaged therewith. In other words, the diameter of the sun gear 72 is such as to be capable of being received in interfitting relation within the teeth 42 when the sleeve 70 is shifted axially to bring about this condition, thereby to lock the sleeve 70 against relative rotation with respect to the differential carrier 34.

The sleeve 70 is also provided with a concentric circular series of teeth 74 on its periphery adjacent its right-hand end, as viewed in Figure 1. The teeth 74 are adapted to be interengaged with complementary teeth 76 formed on a ring member 78 suitably fixed against rotation with and carried by the differential housing 20. The teeth 76 are so located axially of the structure that when the pinion gear 46 is fully in mesh with the internal gear 66 formed on the ring gear 56, the teeth 74 and 76 are engaged with each other, thereby locking the sleeve 70 and its sun gear 72 against rotation.

It will thus be appreciated that the teeth 42 serve in the nature of clutch teeth adapted to engage the teeth of the sun gear 72 to lock the latter and, therefore, the sleeve 70 against relative rotation with respect to the differential carrier 34, and that the teeth 74 and 76 serve as interengageable clutch teeth which, when engaged with each other, lock the sleeve 70 against rotation with respect to the differential housing 20. When the teeth 74 and 76 are in engagement with each other and the sleeve 70, therefore, held stationary, it will be appreciated that the pinion 60 in turning the ring gear 76 about the axes of the shafts 24, because of interengagement of the internal gear teeth 66 with the pinion or planet gears 46, will cause the pinions or planet gears 46 to bodily travel about the sun gear 72 at a slower rate of rotation than the ring gear 56 travels about the axes of the shafts 24. The pinion or planet gears 46 being fixed to the differential carrier 34, they will thus cause the differential carrier 34, consequently the shafts 24, to rotate at a slower speed of rotation than the speed of rotation of the ring gear 56. Thus a low speed axle drive is provided when the sleeve 70 is in the axial position shown in Figure 1.

If now the sleeve 70 is shifted to the right as viewed in Figure 1 from the position shown, the teeth 74 and 76 will be released from engagement with respect to each other and the sleeve 70 will then be free to rotate in the differential housing 20. If the teeth 74 and 76 are separated axially from one another only enough to effect axial separation and not enough to bring the teeth of the sun gear 72 into engagement with the teeth 42 of the differential carrier 34, then the driving connection between the ring gear 56 and the shafts 24 is broken and the gearing is then in a position which corresponds to a neutral or inoperative position of a change-speed transmission. On the other hand, if the sleeve 70 is shifted axially enough to bring the teeth 74 and 76 out of engagement with each other and to bring the teeth of the sun gear 72 into operative engagement with the teeth 42 of the differential carrier 34, at which time the teeth of the sun gear 72 are still in operative engagement with respect to the teeth of the pinions 46, the differential carrier is thereupon locked for equal rotation with respect to the ring gear carrier 50 and consequently upon rotation of the ring gear 56, as by means of the pinion 60, the axle shafts 24 are caused to rotate equally with the ring gear 56. This last described position of the sleeve 70 is the high speed position of operation of the two-speed axle shown.

As before mentioned, the device of the present invention has for its object the shifting of a shiftable element of a change-speed transmission and which, in the two-speed axle construction illustrated in Figure 1, is the sleeve 70. The device of the present invention effects axial shifting movement of the sleeve 70 by means of a double armed lever indicated generally at 80, one end of which is yoked and fits over the axially outer end of the sleeve 70. The opposite arms of the yoke are each provided with an inwardly directed pin 82, as best brought out in Figure 2, which pins are received in a peripheral groove 84 in the sleeve 70 on diametrically opposite sides of the axis of the latter. The lever 80 is nonrotatably mounted upon a pin 86 mounted at its opposite end with a hollow boss 88 integral with the differential housing 20, the pin 86 being retained against axial displacement in the boss 88 by means of a rounded end 90, shown in Figure 2, on a screw 92 and engaged in a peripheral groove 94 of the pin 86. Power is applied to the outer end of the arm 80 by the device of the present invention in order to cause it to pivot about the axis of the pin 86 and thereby effect axial shifting movement of the sleeve 70.

The device of the present invention includes a cast metal housing indicated generally at 100 having an open inner end of substantially the same cross-sectional area and configuration as the open outer end of the hollow boss 88 and provided with an outturned flange 102 which is fixed to the outer end of the boss 88 by means of screws 104, as well as the screw 92 previously mentioned and employed for retaining the pin 86 against axial displacement. The lower outer end of the housing 100 is also open and is closed by a cover plate 106. A pin 108 is mounted between the housing 100 and cover plate 106 below the centerline of the double armed lever 80 and preferably with its axis in radial relation with respect to the axis of the pin 86.

An operating arm 112 is rotatably mounted upon the pin 108 and is formed with a pair of integral, radially outwardly directed arms 114 and 116, these arms being angularly spaced from one another about the axis of pin 108. The arm 114 of the member 112 is formed at its outer end with an axially and inwardly directed flange or finger portion 118, such portion 118 lying in radially spaced relation to the pin 108.

The adjacent end of the yoke or lever 80 is formed with an integral projection 120 which is cylindrical in shape and which is adapted to be engaged, in a manner to be hereinafter described, for rotating the lever 80 about the axis of pin 86 to effect the shift. The projection 120 underlies the portion 118 of the arm 112 so that the lever 80 may pivot or the arm 118 may rotate about its axis in either direction without interference therebetween.

The projection 120 and the arm 118 are interconnected by a relatively heavy coil spring 122 which is arranged in surrounding relation with respect to the hub of member 112 substantially concentric with the axis of the pin 108. As best shown in Figures 2, 3, and 4, the embodiment of the spring there illustrated, is a so-called double wound spring formed from a single length of spring wire in which the wire is helically wound with an inner convolution wound, for example, in a right hand helix, and with an outer concentric convolution wound in a left hand helix. The inner and outer convolutions are spaced from each other so that there may be freedom of movement therebetween within the limits of deflection required.

The ends of the arms of the spring 122 are adjacent the same end of the wound spring unit and are shaped so that they are substantially parallel to each other, such ends being indicated at 124 and 126, as best shown in Figure 4. They are disposed at right angles to the longitudinal centerline of the wound spring and are disposed on the outsides of arm 118 and projection 120, in the path of movement of the arm 118 as it would tend to pivot about its axis in either direction and in the path of movement of the projection 120 as it would be moved in either direction about the axis of pin 86.

The arm 118 is formed with oppositely disposed notches 130 and 132 adjacent the end for proper positioning and aligning of the ends 124 and 126 of the spring as they are engaged by the arm 118.

By the construction above described it will be appreciated that the member 112 may be turned in either direction of rotation and because its arm or finger 118 can pass over the end of projection 120 it is enabled to engage either end 124 or 126 of the spring 122, and apply a turning force to the spring in either direction as a result thereof. In the position of the members 120 and 112 as shown in the drawings, it may be assumed that the member 112 is being turned in a direction to move the finger 118 to the left, thus causing the left hand edge, or notch 130 to engage the end 126 of the spring 122, thereby tending to turn the spring 122 about the axis of the pin 108 and to cause the end 124 to engage the right hand side of projection 120 and thereby tend to turn or pivot the member 120 in the same direction. If the double arm lever 80 is free to turn under such conditions, the force of the spring 122 acts against the projection 120 thus causing the double arm lever 80 to be moved in clockwise direction about the axis of the pin 86 thereby to shift the sleeve 70 to its position of high-speed operation for the rear axle mechanism. On the other hand, if the member 112 is turned in the opposite direction, it will pass over the projection 120 and be brought into engagement with the end 124 of the spring 122 at substantially the same time that the end 126 is brought into engagement with the opposite side of the projection 120; and upon continuing such direction of movement will tension the spring 122 in a direction to move the projection 120 to the right, as viewed in Figure 3, thus causing the lever 80 to pivot in a counterclockwise direction about the axis of pin 86 and thereby tend to shift the sleeve to the position illustrated in Figure 1.

If either of the above described movements of the member 112 is caused at a time that a force is holding the lever 80 against pivotal movement sufficient to overcome the force of spring 122, it will be appreciated that the spring 122 can be wound up or loaded either clockwise or counterclockwise from its normal position, or preloaded position, and if such spring force on the member 112 is maintained, the spring 122 will remain under such stress until the force resisting movement of the lever 80 is relieved, at which time the force thus built up in the spring will become effective to shift the lever 80 and cause a corresponding shifting movement of the shiftable element of the transmission, in the case shown by way of illustration, the sleeve 70.

Those skilled in the art appreciate the fact that when a material amount of torque is being transmitted through the shiftable element of a change-speed transmission, the friction between the teeth of the shiftable element and the meshing gear element through which a torque is also being transmitted offers an unusually high amount of resistance to shifting of the shiftable element. The member 112 may be rotated in either one direction or the other, depending upon which direction it is desired to pivot the lever 80, and as long as a material amount of torque is being transmitted through the sun gear 72 on the sleeve 70, the friction between the teeth on the sun gear 72 and the teeth of the pinions 46 will be sufficient to overcome the force of the spring 122. However, the spring 122 is made of such a strength that under such conditions when the torque being transmitted through the sun gear 72 is substantially relieved, the force of the spring will effectively and surely shift the sleeve 70 to the desired opposite position of operation.

The means provided for shifting the member 112, in the embodiment illustrated, is the same as that described in Russell Patent No. 2,462,779 for shifting the member 112 in that patent. Such means includes an electric motor 150, which is mounted within the housing 100 and which is arranged with its axis vertically and horizontally offset from the axis of pin 108. The motor shaft projects downwardly into the housing and into the bore of a vertically disposed screw element 152 in which it is suitably fixed against relative rotation. The lower end of the screw element 152 is fixed against relative axial movement in an anti-friction bearing assembly 154 which is in turn held against axial movement in the lower end of housing 100 by means of cover plate 106 screwed thereon.

The screw element 152 is provided with a nut 158 which is adapted to travel axially therealong, the nut being provided with a pair of diametrically opposed projecting pins 160. The outer end of the arm 116 is bifurcated and receives the nut 158 therein. The bifurcated ends are formed with notched recesses 162 for the reception of the pins 160 therein.

It will be appreciated that upon actuation of the reversible motor, the screw 152 may be turned in either direction causing the nut 158 to travel therealong and thus effecting a pivotal movement of the member 112 in the direction desired.

For a more detailed description of the contraction and actuation of the motor and screw assembly and for the control thereof, reference may be had to the Russell patent above mentioned.

Referring to Figs. 6 and 7, a modified form of the present invention is illustrated in which the structure is the same as that described above except in certain details to be mentioned.

Instead of forming the lever 80 with an integral projection 120, as in the embodiment above described, the end of the lever adjacent the spring is formed with a cylindrical bore 170. A pin 172 having a cylindrical base is disposed within the bore 170 with the outer projecting end circular in cross section but formed with a reduced central portion 174' between the base and the end to engage the projecting ends of the spring and maintain them in proper position and alignment as the lever 80 pivots.

Instead of employing the double coil spring 122 as in the embodiment above described, a single coil spring 174 is employed. Such spring 174 is formed of a single length of spring wire wound from one end in a helix and then the opposite end is brought back to the first end on the outside of the helix as indicated at 176. The ends of the spring, indicated at 178 and 180, correspond to the ends 124 and 160 above described, and are similarly formed to be parallel to each other as will be evident by a comparison of Figures 5 and 7.

The operation of the embodiment shown in Figures 6 and 7 is the same as that described above.

Formal changes may be made in the specific embodiments of the invention described without departing from the spirit of the invention, the scope of which is commensurate with the appended claims.

What is claimed is:

1. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a first rotatable member having one end connected to said shiftable member for simultaneous movement therewith and having an integral projection with rounded sides extending from the other end, means mounting said first rotatable member intermediate its ends for rotation about one axis, a second rotatable member mounted for rotation about an axis substantially at a right angle to said one axis and rotatable independently of said first rotatable member, and a double wound torsion spring disposed about the axis of rotation of said second rotatable member and having the ends thereof disposed at the same end of the wound spring extending in substantial parallel relation to each other in a direction at substantially a right angle to the axis of the spring and said ends being disposed in the paths of rotation of said integral projection and said second rotatable member resiliently interconnecting said rotatable members and so constructed and arranged that rotation of the second-mentioned rotatable member in either direction of rotation applies directly through said spring means a turning force on the first rotatable member in a corresponding direction without necessitating simultaneous rotation of said first rotatable member, and means for turning said second rotatable member in either direction of rotation independently of rotatable movement of said first rotatable member, whereby a turning force may be built up on said first rotatable member independently of movement of said shiftable member, thereby to effect shifting of said shiftable member immediately upon the cessation of the transmission of material amounts of power therethrough.

2. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a first rotatable member having one end connected to said shiftable member for simultaneous movement therewith and having an integral projection with rounded sides extending from the other end, means mounting said first rotatable member intermediate its ends for rotation about one axis, a second rotatable member mounted for rotation about an axis substantially at a right angle to said one axis and rotatable independently of said first rotatable member, and a helical torsion spring formed of a single length and wound with inner and outer concentric convolutions, said spring being disposed about the axis of rotation of said second rotatable member and having the ends thereof disposed at the same end of the wound spring extending in substantial parallel relation to each other and said ends being disposed in the paths of rotation of said integral projection and said second rotatable member resiliently interconnecting said rotatable members and so constructed and arranged that rotation of the second-mentioned rotatable member in either direction of rotation applies directly through said spring means a turning force on the first rotatable member in a corresponding direction without necessitating simultaneous rotation of said first rotatable member, and means for turning said second rotatable member in either direction of rotation independently of rotatable movement of said first rotatable member, whereby a turning force may be built up on said first rotatable member independently of movement of said shiftable member, thereby to effect shifting of said shiftable member immediately upon the cessation of the transmission of material amounts of power therethrough.

References Cited in the file of this patent

UNITED STATES PATENTS

| | | | |
|---|---|---|---|
| 815,578 | Brown | Mar. 20, | 1906 |
| 1,594,301 | Heymer | July 27, | 1926 |
| 2,203,057 | Moore | June 4, | 1940 |
| 2,357,781 | Randol | Sept. 5, | 1944 |
| 2,384,448 | Banker | Sept. 11, | 1945 |
| 2,402,343 | Price | June 18, | 1946 |
| 2,462,779 | Russell | Feb. 22, | 1949 |

FOREIGN PATENTS

| | | | |
|---|---|---|---|
| 803,966 | Germany | Apr. 12, | 1951 |